United States Patent [19]

Anbar et al.

[11] 3,970,474

[45] July 20, 1976

[54] METHOD AND APPARATUS FOR ELECTROCHEMICAL GENERATION OF POWER FROM CARBONACEOUS FUELS

[75] Inventors: Michael Anbar, Palo Alto; Donald F. McMillen, Menlo Park; Robert D. Weaver, Palo Alto; Paul J. Jorgensen, Cupertino, all of Calif.

[73] Assignee: Stanford Research Institute, Menlo Park, Calif.

[22] Filed: Aug. 11, 1975

[21] Appl. No.: 603,591

[52] U.S. Cl. ............................................... 136/86 A
[51] Int. Cl.² ................................................ H01M 8/18
[58] Field of Search ................................. 136/86 A

[56] References Cited
UNITED STATES PATENTS 775,472   11/1904   Jone ............................. 136/86 A Primary Examiner—John H. Mack
Assistant Examiner—H. A. Feeley
Attorney, Agent, or Firm—Donovan J. De Witt

[57] ABSTRACT

Method and apparatus for the pollution-free generation of electrical power from carbonaceous fuels in which molten lead is electrochemically oxidized to produce lead oxide and electricity in a single integrated cell in which the resulting lead oxide is simultaneously converted back to lead metal by carbothermic reduction with a carbonaceous fuel, the entire process being carried out in a single cell using a molten carbonate as electrolyte in a temperature range of 500° to 900° C. The entire cycle thus consumes only carbon and oxygen and produces electricity. It is found that by thus coupling the electrochemical cell and the thermochemical regeneration system, the resulting integrated carbon-lead-air cell will maintain a voltage well above that provided by a simple lead-air cell approaching that of a hypothetical carbon-air cell.

3 Claims, 2 Drawing Figures

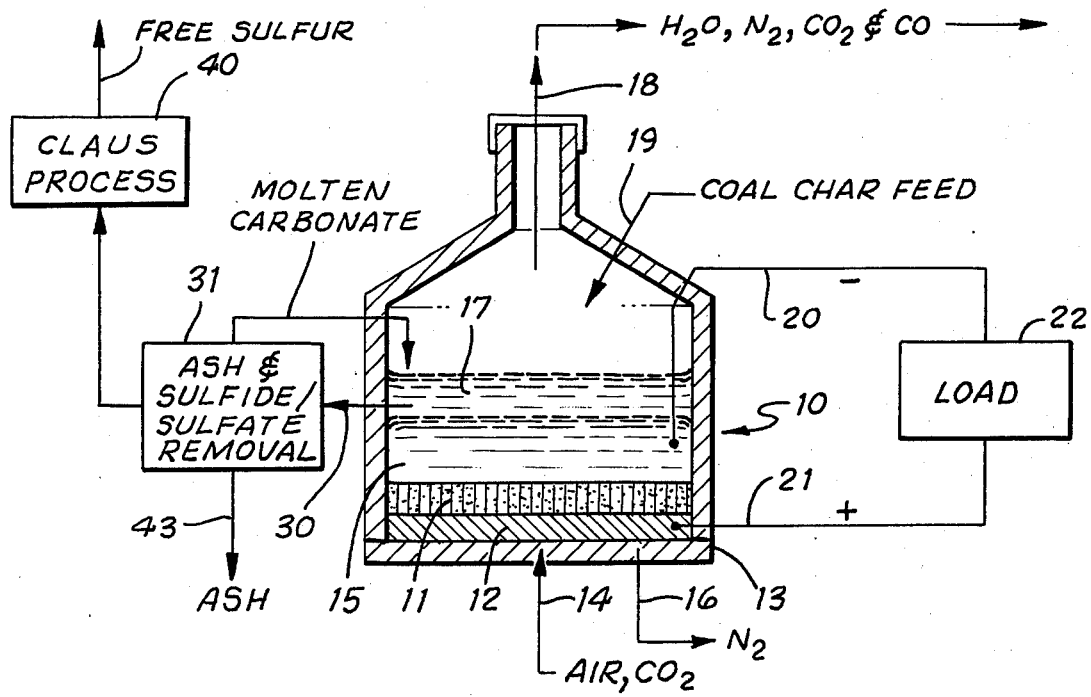
FIG_1
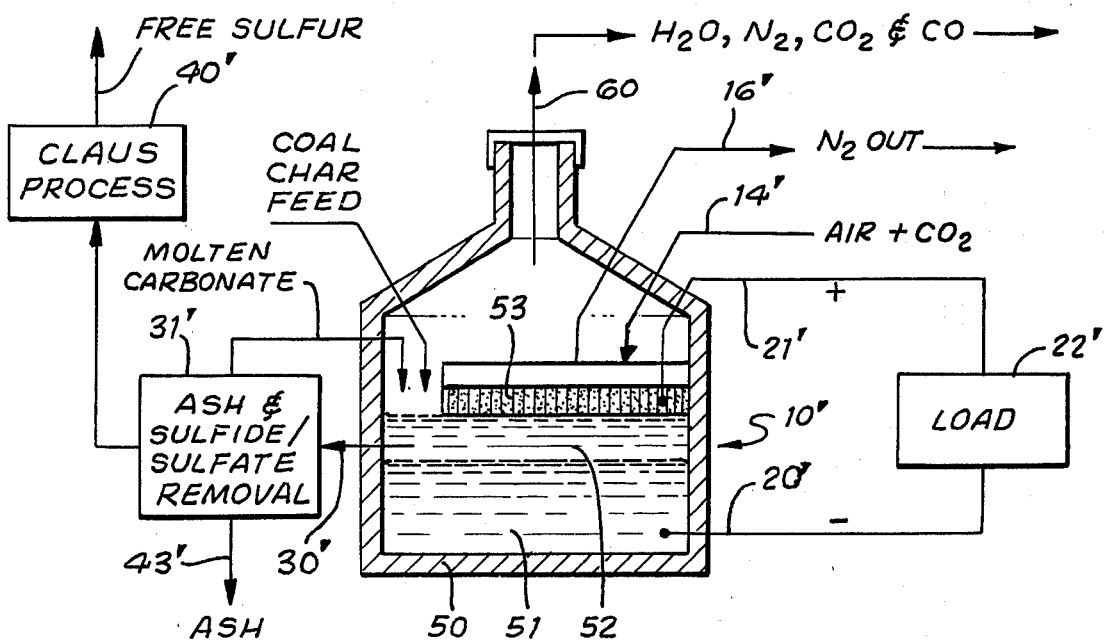
FIG_2

METHOD AND APPARATUS FOR ELECTROCHEMICAL GENERATION OF POWER FROM CARBONACEOUS FUELS

BACKGROUND OF THE INVENTION

The invention described herein was made in the course of work under a grant or award from the United States National Science Foundation.

U.S. Pat. No. 3,741,809, issued June 26, 1973, to M. Anbar (herein the "Anbar" patent), discloses a method and apparatus for the pollution-free generation of electrochemical energy from coal or other carbonaceous fuels. The process there disclosed is a cyclical one in which a metal of the group consisting of lead, bismuth and antimony is first oxidized with oxygen at high temperatures in an electrochemical cell containing a molten salt electrolyte, the cell being one wherein said metal is the anode and oxygen is supplied at the cathode. The resultant oxidation of the metal generates the electromotive force. The formed metal oxide, e.g., PbO, is taken up by the molten salt and carried to an adjacent regeneration chamber to which carbonaceous fuel is supplied to reduce the metal oxide back to the form of metal which separates in molten form from the molten salt and is returned to the electrochemical cell to continue the cycle. While a practice of the method disclosed in the Anbar patent will theoretically produce an open cell voltage of approximately 0.76 volt at 450° C or 0.7 volt at the more efficient operating temperature of 600° C, the effective, or load voltage which can be obtained therefrom as a practical matter at 600° C does not exceed about 0.5 volt or about 0.4 volt at 800° C. The invention disclosed in the Anbar patent is assigned to the assignee of the present invention, and the subject matter of the said patent is specifically incorporated herein, by reference, for background information.

It is an object of this invention to provide a method and apparatus which, while utilizing the electrochemical cell of the Anbar patent, is nevertheless capable of providing much higher open circuit and operating voltages. A more particular object is to provide a cell structure which eliminates the necessity for material transport from the regeneration reactor to the electrochemical cell and vice versa.

It will be observed that in the simple metal-air cell disclosed by Anbar the voltage is necessarily limited to that provided by the free energy of formation of the metal oxide, e.g., PbO, at unit activity. The free energy released by subsequent chemical reduction of the metal oxide is not available as electric power. It is a further object of this invention to provide a method and apparatus wherein both the free energy of formation of the metal oxide and the free energy released by chemical reduction of said oxide become available as electric power, the resulting voltage tending to assume a higher value as determined by the more negative free energy of formation of carbon dioxide.

SUMMARY OF INVENTION

It has been found that the foregoing and other objects of the invention can be obtained by integrating both the metal oxidation and the metal oxide reduction steps, as taught by Anbar, into a single unit adapted to rapidly convert the metal oxide back to the molten metal in situ. In addition to overcoming the critical material transport problems inherent in the use of a separate regeneration chamber, this integration of the respective processes into a single cell unit results in an electrochemical converter unit with a much higher voltage than obtainable from the metal-air cell in which the metal oxide (e.g., PbO) is at unit activity. The entire process is carried out at temperatures ranging from 500° to 900° C in an electrochemical cell provided with a molten salt electrolyte to which coal, coal char, or other carbonaceous fuel is added so as to reduce the metal oxide being continuously formed in the cell back to the molten state substantially as fast as the said oxide is produced. This has the effect of keeping the activity of the metal oxide well below unity and thus increasing the cell voltage.

The entire cyclic operation of the present invention consumes only carbon and oxygen while producing electricity, the system being capable of providing effective, or load voltages of above 0.7 volt at 800° C. This represents a clear improvement of at least a 40% increase in efficiency over a nonintegrated system of the type disclosed in the Anbar patent.

The electrochemical cells employed in the practice of this invention are those having an anode made up of appropriate molten metal with good thermodynamic efficiency and a relatively low melting point as typified by lead, bismuth and antimony, for example. The cell is provided with one or more layers of a molten salt, typically a mixture of alkali metal carbonates which constitute the electrolyte, as well as with a cathode member capable of reducing oxygen supplied thereto and thereby generating the desired electromotive force. The cell contains a free-flowing layer of the molten salt, with any other molten salt present being immobilized by containment in a suitable support such as alumina or the like. The free-flowing salt layer overlies the molten metal and interfaces therewith, said salt layer being provided with a supply of a carbonaceous fuel present in such amounts as to rapidly convert (reduce) the metal oxide, formed between the molten metal and the reduced oxygen, back to the molten metal state. When the cathode is positioned above the molten lead, the intervening space is filled by the fuel-containing, free-flowing, molten salt layer. On the other hand, when the cathode is placed beneath the molten metal it is spaced therefrom by an immobilized layer of molten salt which contains no carbonaceous material, the latter being present in the free-flowing molten salt layer which overlies the molten metal. Both types of cell structure will be described below in connection with the accompanying drawing.

The cell will operate for short periods of time at good efficiency as it uses up a supply of carbonaceous fuel contained in the free-flowing molten salt layer. However, for longer periods of operation provision is made for the continuous or intermittent addition of fuel such as finely divided coal, coal char, charcoal or CO or even organic wastes to the said molten salt layer. Provision can be made, where necessary, to remove ash and any sulfide generated in the molten layer, such methods forming no part of the present invention. As has been stated above, the net reaction taking place in the electrochemical cell employed in the present invention is to oxidize carbon present in the fuel to carbon dioxide and to produce electrical power. The resultant carbon dioxide is released in some cases along with some nitrogen gas ($N_2$) formed from bound nitrogen in the fuel. Carbon dioxide is also normally added with the oxygen (air) supplied at the cathode since it is required in the cathode reaction in order to prevent decomposition, at cell operating temperatures of about 500° to 900° C, of molten carbonate salts when the latter are employed as an electrolyte. It will thus be seen that the invention provides a method whereby the energy present in the widely available and inexpensive fuels such as coal, coal char, charcoal, CO, hydrocarbons and other carbonaceous materials can be recovered with a high degree of efficiency, as evidenced by the relatively high voltages which characterize the cell's output of electrical current. This result is obtained without at the same time generating harmful, polluting gases. Thus, nitrogen present in the system is released as $N_2$ gas, hydrogen in the fuel is released in the form of water vapor and sulfur present in the fuel becomes bound into the molten salt layer, for subsequent release therefrom, ultimately as elemental sulfur, by the practice of conventional processing techniques.

Of the various metals which can be melted and successfully employed in the electrochemical cell, lead, bismuth and antimony constitute a preferred class. In turn, lead is the preferred metal of this class due to its relatively low cost, good thermal efficiency and relatively low melting temperature. Accordingly, the present invention, for convenience, will be hereinafter described as it relates to the use of molten lead as the cell anode.

A variety of salts, or mixtures of salts, can be employed to form the molten salt layer in the cell, the important criteria being that the salt composition becomes molten at temperatures between about 400° and 800° C, that the molten salt be alkaline and relatively stable at operation conditions ranging from about 500° to 900° C, that it be relatively inert to lead and lead (or other metals) oxide, that it have a resistivity of the order of about 0.05 and 0.5 ohm-cm., and that it be relatively non-corrosive, and that it catalyze the carbothermic reduction of metal oxides. Various alkali metal salts, e.g., carbonates, have these desired qualities and a particularly preferred salt composition adapted for use in the present invention comprises a mixture of sodium, potassium and lithium carbanates. As indicated above, any tendency of these salts, notably $K_2CO_3$, to decompose at operating temperatures of about 500° C is suppressed by the presence of carbon dioxide gas in the cell, the same being formed as an incident of the oxidation of lead to lead oxide or by reaction of oxygen (supplied by PbO) with C or CO. $CO_2$ is also normally added at the cathode along with oxygen (air).

The cathode element of the cell to which oxygen and other gases are supplied is one of a conventional character and can be a porous ceramic material coated with silver, copper oxide or NiAg which acts to catalyze formation of oxide ions ($O^{2-}$) or carbonate ions ($CO_3^{2-}$). In lieu of the coating, a silver screen can be employed to this same end. These ions which form at the cathode then react with the lead to form lead oxide, carbon dioxide also being released. The lead oxide, which may be partially soluble in the free-flowing molten salt layer, rapidly reacts with the carbonaceous fuel and is thus reduced to metal form, it dropping back into the underlying body of molten lead constituting the anode of the cell.

The amount of carbonaceous fuel to be supplied to the cell for admixture with the free-flowing molten salt layer may be varied over a relatively wide range and will depend somewhat on the desired proportions of CO and $CO_2$ in the product gas discharged from the cell. This $CO_2$/CO ratio is a function of the available carbon (fuel) content in the cell, the temperature at which the cell is operated and the current density. Increasing the relative amount of carbon employed, the use of higher cell temperatures and employment of lower current densities all make for increased CO production at the expense of $CO_2$. Thus, in operating a given cell the carbonaceous fuel may be added at such a rate that the cell comes to equilibrium at maximum voltage, a condition which can be described as one of carbon excess. Here, other factors being equal, the proportion of CO will be high. Conversely, by operating with lesser amounts of carbon at perhaps somewhat less than maximum voltage, a gas stream can be recovered which is very rich in $CO_2$.

In one embodiment of this invention where advantage is taken of this ability to recover a CO rich product stream, the CO obtained is supplied as the fuel stream to a companion cell. By then coupling the electrical outputs of the respective C-fueled and CO-fueled cells in series, open circuit voltages of about 1.7 – 1.8 volts can be realized. An advantage of this modification is that the CO-fueled cell will not accumulate ash, sulfides or the like and thus may be run indefinitely at peak efficiencies. This arrangement results in the virtual preconcentration of ash, which may be advantageous in certain ash removal schemes.

Various of the reactions which take place in the cell of the present invention are as follows:

$$Pb(l) + \tfrac{1}{2} O_2 \rightarrow PbO + \text{electricity}$$

$$C + CO_2 \rightarrow 2CO$$

$$PbO + CO \rightarrow Pb + CO_2$$

The first reaction written above represents a summary of the following reactions:

$$CO_2 + \tfrac{1}{2} O_2 + 2e^- \rightarrow CO_3^{=}$$

$$Pb + CO_3^{=} \rightarrow PbO + CO_2 + 2e^-$$

DESCRIPTION OF PREFERRED EMBODIMENTS

The invention will be more clearly understood by reference to the figures of the appended drawing wherein:

FIG. 1 represents a schematic flow diagram of an embodiment of an electrochemical cell of the present invention which contains both a free-flowing molten salt layer as well as an immobilized molten salt layer; and FIG. 2 represents another embodiment of electrochemical cells of the present invention which embodies only a free-flowing molten salt layer.

Referring more particularly to FIG. 1 of the drawing, there is shown an electrochemical cell made up of a generally cylindrical vessel 10 having an open bottom into which is fitted a porous sintered alumina disk 11 impregnated with molten salt held immobilized by capillary forces in the said alumina disk. A silver screen cathode member 12 is maintained against the lower surface of the alumina disk 11 by a bottom member 13. The latter member is adapted to receive air and $CO_2$ gases through line 14. Oxygen and $CO_2$ pass upwardly to screen 12 and pass through disk 11 as carbonate ions which, in turn, pass into a body 15 of molten lead supported on the upper surface of the alumina disk 11. The capillary forces in the latter are sufficiently strong that the adjacent molten lead cannot pass therethrough. The nitrogen admitted to the bottom member 13 is discharged at 16. Supported upon the molten lead layer is a layer 17 of molten alkali metal carbonates, said carbonate salt being free-flowing and containing a carbon fuel material along with a certain amount of lead oxide. Product gases $CO_2$, CO, $H_2O$ and $N_2$ (from the fuel nitrogen) vent through line 18, while fresh carbonaceous fuel is supplied via line 19. An electrical connection is shown at 20 leading from the molten lead which acts as the anode, while a similar connection is shown at 21 leading from the silver screen cathode, the resulting circuit incorporating the load 22.

Provision is made at 30 to remove molten salt from layer 17 for ash, sulfide and sulfate removal in a clean-up zone 31. Typically the molten salt so removed is quenched in water which dissolves the carbonates and converts the sulfur-containing products to sulfide anion (H5) which may then ultimately be converted to elemental sulfur, as for example in a Claus plant shown at 40. The ash present in the molten salt is largely insoluble in the aqueous quenching bath and may be removed therefrom as a solid, via line 43. In operation, the cell is brought up to operating temperatures and maintained thereat by placing the same in a furnace (not shown). The reactions in the cell are exothermic overall, so, under optimum conditions of heat conservation, no further heating of the cell is required once the same is in operation at 500° – 900°C.

Referring to FIG. 2 of the drawing, there is shown at 10' an electrochemical cell made up of a vessel 50 having a layer of molten lead 51, serving as a cell anode, lying at its bottom. Floating on the lead layer is the layer 52 of molten alkali metal carbonates, said layer being free-flowing and containing a carbonaceous fuel material along with a certain amount of lead oxide. Supported adjacent the salt layer 52 is a 2-layer porous cathode 53 having a CuO facing which is in contact with the upper surface of the said salt layer. This cathode member 53 is so sized as to cover less than the entire surface of salt layer 52, leaving space for product gases to leave this salt layer and to exit from the cell through line 60. Air and $CO_2$ are supplied to the cell via line 14', with nitrogen in the feed gases being discharged through line 16'. An electrical connection is shown at 20' leading from the molten lead, while a similar connection is shown at 21' leading from the cathode with the resulting circuit incorporating the load 22'.

Provision is made at 30' to withdraw molten salt from layer 52 for ash, sulfide and sulfate removal in a clean-up zone 31'. The clean up of the salt is accomplished in the same manner as described above, using a Claus plant 40', and with ash material being withdrawn at line 43'.

The following example is illustrative of the practice of the present invention in one embodiment thereof:

EXAMPLE

In this operation there is employed a cell of the type illustrated in FIG. 1. The cathode is made up of a silver screen maintained in close contact with the lower surface of a porous sintered alumina disk approximately 3 mm thick impregnated with molten alkali metal salts (40% $Li_2CO_3$ and 30% each of $Na_2CO_3$ and $K_2CO_3$). This support was overlaid with a molten layer of lead approximately 7 mm thick, this layer, in turn, supporting a free-flowing molten carbonate layer, approximately 6 mm thick, of the same composition as contained in the alumina support. As the carbonaceous fuel there is employed a carbon disk approximately 4 mm thick, which is so positioned within the cell as to reside in part within the free-flowing salt layer and in part within the underlying molten lead layer. In making up the electrical circuit, the contact with the lead cathode was by way of a graphite rod, while a silver wire was employed as a connection to the silver cathode. In operation at 805° C and at 30 mA/cm², and with air and $CO_2$ being supplied to the cathode in the proportions of 68% and 32%, respectively, it is observed that the closed circuit voltage is 0.7 volt. The $CO_2$/CO ratio of discharge gases at the time of this operation has a value of 0.15. In operation at 740° C, the open circuit voltage obtained is 0.95 volt, the condition within the cell at this time being such that $CO_2$ and CO are present in equal amounts, in the space above the free-flowing molten salt layer.

We claim:
1. In a method of generating electromotive force wherein a supply of a coal, charcoal, coal char or CO carbonaceous fuel is maintained in contact with the electrolyte of a first electrochemical cell having (1) a molten metal anode made up of lead, antimony or bismuth, (2) an electrolyte made up of a molten salt maintained at temperatures above the melting point of the anode metal, and (3) a cathode adapted to receive an oxygen-containing gas and supply the oxygen to the electrolyte in reduced form, thereby generating the desired electromotive force, wherein during operation of the cell the molten anode metal is oxidized with the oxygen in the molten electrolyte as the carbonaceous fuel simultaneously reduces the formed metal oxide back to the molten metal condition, and wherein the gases discharged from the cell comprise CO, $CO_2$, water vapor and any nitrogen supplied along with the oxygen, the improvement which comprises maintaining an excess of the carbonaceous fuel in the molten electrolyte such that, of the discharged CO and $CO_2$ gases, the CO predominates, recovering the CO gas so discharged and employing the same as the carbonaceous fuel supplied to a second electrochemical cell generally operated in the general fashion as the first cell except that the supply of CO to the second cell is so regulated that of the discharged CO and $CO_2$ gases, the CO $_2$ predominates.

2. The method of claim 1 wherein the molten electrolyte salt is a mixture of alkyl metal carbonates.

3. The method of claim 2 wherein a mixture of air and carbon dioxide is supplied to the cathode of each of the electrochemical cells.

* * * * *